United States Patent
Kim et al.

(10) Patent No.: US 9,144,092 B2
(45) Date of Patent: Sep. 22, 2015

(54) APPARATUS AND METHOD FOR DETECTING EMERGENCY STATUS IN WIRELESS COMMUNICATION SYSTEM

(75) Inventors: Kyung-Kyu Kim, Seoul (KR); Jung-Shin Park, Seoul (KR); Hyun-Jeong Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 541 days.

(21) Appl. No.: 13/284,643

(22) Filed: Oct. 28, 2011

(65) Prior Publication Data
US 2012/0115431 A1    May 10, 2012

(30) Foreign Application Priority Data
Nov. 10, 2010  (KR) .................. 10-2010-0111316

(51) Int. Cl.
| | |
|---|---|
| H04M 11/04 | (2006.01) |
| H04W 76/00 | (2009.01) |
| H04W 4/02 | (2009.01) |
| H04W 4/22 | (2009.01) |
| H04W 24/04 | (2009.01) |
| H04W 36/16 | (2009.01) |

(52) U.S. Cl.
CPC ............ *H04W 76/007* (2013.01); *H04W 4/021* (2013.01); *H04W 4/22* (2013.01); *H04W 24/04* (2013.01); *H04W 36/16* (2013.01)

(58) Field of Classification Search
CPC ..... H04W 4/22; H04W 76/007; H04W 36/16; H04W 48/20; H04W 76/028; H04W 48/02; H04W 74/0833; H04W 88/02; H04W 24/04; H04W 4/021; H04W 52/143; H04W 52/223; H04W 52/244; H04W 52/283; H04W 52/325
USPC ................... 455/404.1, 458, 404.2, 436–445
See application file for complete search history.

(56) References Cited

U.S. PATENT DOCUMENTS

| | | | | |
|---|---|---|---|---|
| 5,841,848 | A * | 11/1998 | Dunn | 379/138 |
| 6,233,445 | B1 * | 5/2001 | Boltz et al. | 455/404.2 |
| 6,408,172 | B1 * | 6/2002 | Alperovich et al. | 455/404.1 |
| 6,628,933 | B1 * | 9/2003 | Humes | 455/404.1 |
| 7,031,714 | B1 * | 4/2006 | Rayburn | 455/445 |
| 7,039,425 | B1 * | 5/2006 | Mazawa et al. | 455/456.4 |
| 8,385,879 | B2 * | 2/2013 | Thomas | 455/404.1 |
| 8,693,978 | B2 * | 4/2014 | Shi et al. | 455/404.2 |
| 8,731,515 | B2 * | 5/2014 | Muhonen | 455/404.2 |
| 2006/0276168 | A1 * | 12/2006 | Fuller et al. | 455/404.2 |
| 2011/0038284 | A1 * | 2/2011 | Senarath et al. | 370/279 |
| 2011/0105110 | A1 * | 5/2011 | Carmon et al. | 455/422.1 |
| 2014/0087780 | A1 * | 3/2014 | Abhyanker et al. | 455/521 |
| 2014/0162582 | A1 * | 6/2014 | Daly et al. | 455/404.1 |

* cited by examiner

*Primary Examiner* — Sharad Rampuria (57) ABSTRACT

A method and an apparatus handle an emergency in a wireless communication system. A method of a serving Base Station (BS) for detecting an emergency in a wireless communication system includes receiving an emergency call signal from Mobile Stations (MSs) in a cell; determining whether the number of the received emergency call signals exceeds a threshold number of times; when the number of the received emergency call signals exceeds the threshold number of times, detecting an emergency of a BS; and transmitting a message indicating the emergency to an MS in the cell.

20 Claims, 9 Drawing Sheets

APPARATUS AND METHOD FOR DETECTING EMERGENCY STATUS IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Nov. 10, 2010, and assigned Serial No. 10-2010-0111316, the entire disclosure of which is hereby incorporated by reference.

TECHNICAL FIELD OF THE INVENTION

The present invention relates generally to an apparatus and a method for handling an emergency in a wireless communication system. More particularly, the present invention relates to an apparatus and a method for detecting an emergency of a base station and maintaining communication of a mobile station in the corresponding base station.

BACKGROUND OF THE INVENTION

For an emergency such as disaster, wireless communication systems provide services which promptly inform users of the emergency. For example, when a disaster occurs, a base station in the wireless communication system provides a service which broadcasts a message informing of the disaster over a specific frequency so that all of users can recognize the disaster.

In particular, since a catastrophe such as earthquake, fire, or terror attack can cut a line interconnecting the base station and a core network, a conventional wireless communication system provides a service for handling the isolation of the base station by periodically transmitting and receiving a keep-alive message between the base station and the core network.

However, when the base station and the core network periodically transmit and receive the keep-alive message over a certain number of times and the transmission and reception of the keep-alive message continuously fails over a threshold number of times, the using of the keep-alive message can detect the isolation of the base station. In result, it takes a long time to detect the isolation of the base station. For example, when the keep-alive message transmitted and received at intervals of 5 seconds continuously fails for 11 times, the conventional base station and core network determine the line disconnection between the base station and the core network and accordingly it takes 55 seconds to detect the isolation of the base station. Though 55 seconds can be a short time period in general situations, it is not short at all in case of an emergency could damage human life and property within a few seconds.

In this respect, a method and an apparatus for detecting the emergency of the base station within a short time and maintaining the communication of the mobile station in the base station are demanded.

SUMMARY OF THE INVENTION

To address the above-discussed deficiencies of the prior art, it is a primary aspect of the present disclosure to provide a method and an apparatus for detecting an emergency of a base station in a wireless communication system.

Another aspect of the present disclosure is to provide a method and an apparatus for detecting an emergency of a base station according to a number of emergency calls in a base station area in a wireless communication system.

Yet another aspect of the present disclosure is to provide a method and an apparatus of a base station for detecting disconnection from a core network and reporting the disconnection to the core network in a wireless communication system.

Still another aspect of the present disclosure is to provide a method and an apparatus for informing of an emergency of a base station through handover of a mobile station when the emergency of the base station occurs in a wireless communication system.

A further aspect of the present disclosure is to provide a method and an apparatus for maintaining communication of a mobile station in a base station disconnected from a core network in a wireless communication system.

According to one aspect of the present disclosure, a method of a serving Base Station (BS) for detecting an emergency in a wireless communication system includes receiving an emergency call signal from Mobile Stations (MSs) in a cell; determining whether the number of the received emergency call signals exceeds a threshold number of times; when the number of the received emergency call signals exceeds the threshold number of times, detecting an emergency of a BS; and transmitting a message indicating the emergency to an MS in the cell.

According to another aspect of the present disclosure, a method of an MS for detecting an emergency in a wireless communication system includes receiving a message indicating an emergency from a serving BS; and transmitting a message indicating the emergency of the serving BS to a neighboring BS.

According to yet another aspect of the present disclosure, a method of a neighboring BS for detecting an emergency of a serving BS in a wireless communication system includes receiving a message indicating an emergency of the serving BS from an MS; and reporting the emergency of the serving BS of the MS to a core network.

According to still another aspect of the present disclosure, an apparatus of a serving BS for detecting an emergency in a wireless communication system includes a controller for determining whether the number of emergency call signals received from MSs in a cell exceeds a threshold number of times, detecting an emergency of a BS when the number of the emergency call signals exceeds the threshold number of times, and controlling to transmit a message indicating the emergency to an MS in the cell; and a transceiver for receiving the emergency call signal from the MSs in the cell and transmitting the message indicating the emergency to the MS in the cell under control of the controller.

According to a further aspect of the present disclosure, an apparatus of an MS for detecting an emergency in a wireless communication system includes a controller for, when receiving a message indicating an emergency from a serving BS, controlling to transmit a message indicating the emergency of the serving BS to a neighboring BS; and a transceiver for transmitting and receiving messages under control of the controller.

According to a further aspect of the present disclosure, an apparatus of a neighboring BS for detecting an emergency of a serving BS in a wireless communication system includes a controller for, when receiving a message indicating an emergency of the serving BS from an MS, controlling to report the emergency of the serving BS of the MS to a core network; and a transceiver for transmitting and receiving messages under control of the controller.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a method and an apparatus of a base station for detecting an emergency and reporting the emergency to a core network through handover of a mobile station in cell coverage of the base station in a wireless communication system. Hereinafter, while Institute of Electrical and Electronics Engineers (IEEE) 802.16m or IEEE 802.16n is explained by way of example, the present disclosure is applicable to every system including a mobile station which needs to receive a message.

Figure 1:
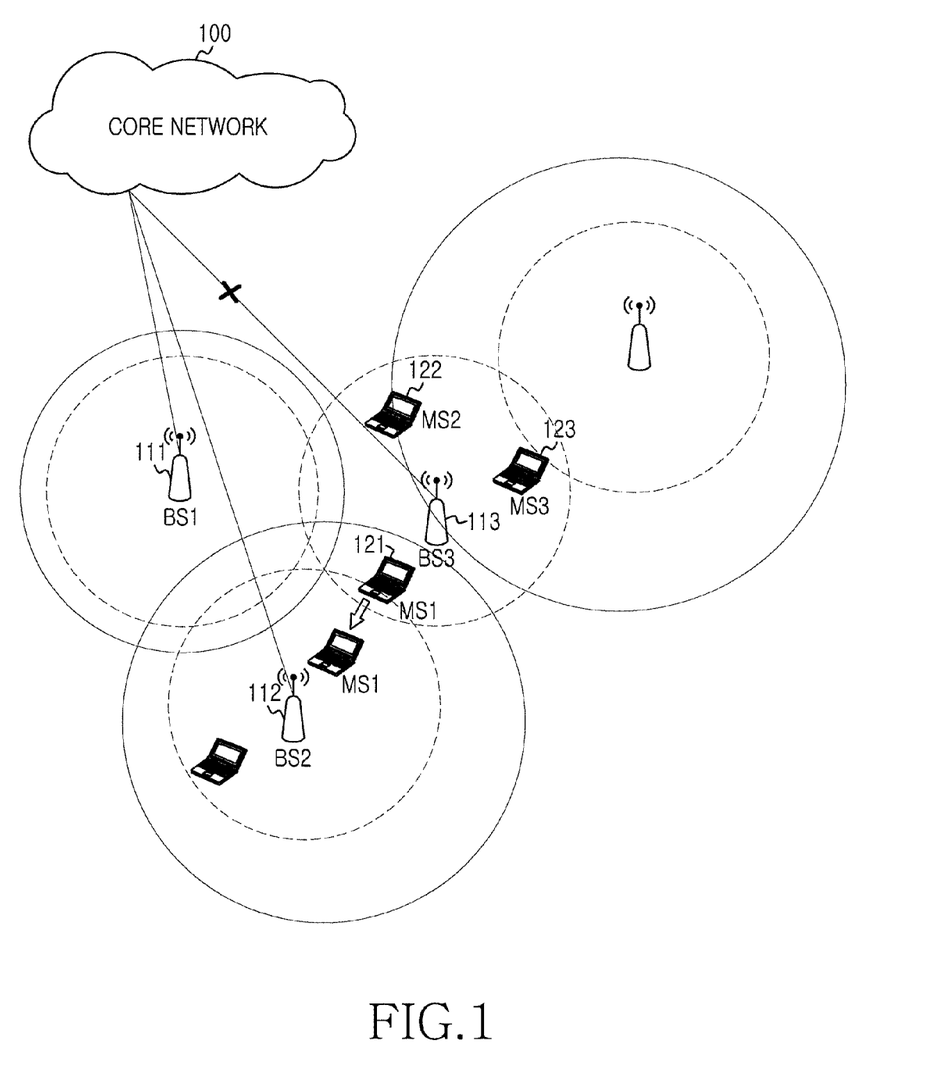
FIG. 1 illustrates an emergency caused by isolation of a base station in a wireless communication system according to an exemplary embodiment of the present disclosure.

FIG. 1 illustrates an emergency caused by isolation of a base station in a wireless communication system according to an exemplary embodiment of the present disclosure.

Referring to FIG. 1, it is assumed that a core network 100, a plurality of Base Stations (BSs) 111, 112, and 113, and a plurality of Mobile Stations (MSs) 121, 122 and 123 are communicating with each other and a line between the core network 100 and the BS3 113 is disconnected. The line between the core network 100 and the BS3 113 can be disconnected because of a disaster such as earthquake, fire, and terror attack, or for other reasons. Herein, it is assumed that the BS3 113 normally operates.

Initially, the BS3 113 communicates with the core network 100 and the MSs 121 and 122 in the corresponding cell coverage, and periodically transmits and receives a keep-alive message to and from the core network 100. The keep-alive message is a message transmitted and received to examine whether the connection line between the BS3 113 and the core network 100 is available.

On account of the disaster, the MSs 121, 122, and 123 traveling in the cell coverage of the BS3 113 can transmit an emergency call signal to the BS3 113. The BS3 113 determines whether the line to the core network 100 is disconnected; that is, whether the emergency occurs by checking whether the emergency call signal is received over a threshold number of times.

When receiving the emergency call signal over the threshold number of times, the BS3 113 determines the emergency occurrence and transmits a handover command message indicating the emergency to the MS requesting handover or the MS1 121 traveling in the boundary of the cell coverage. Next, the BS3 113 enters a standalone mode and services the MSs in its cell coverage. Herein, the BS3 113 can provide all of services not requiring the connection to the core network 100 to the MSs in the cell coverage. The BS3 113 can provide services in the standalone mode over the same previous channel or a predetermined dedicated channel.

The MS1 121 receiving the handover command message searches for neighboring BSs, determines the BS2 112 as a handover target BS, performs a network re-entry procedure for the target BS 112, and notifies the emergency of the BS3 113.

The BS2 112 transmits the emergency of the BS3 113 to the core network 100, and the core network 100 searches for neighboring BSs of the BS3 113 and transmits a power control message to the searched neighboring BSs. The power of the neighboring BSs is controlled to recover the area excluded by the emergency of the BS3 113.

Figure 2:
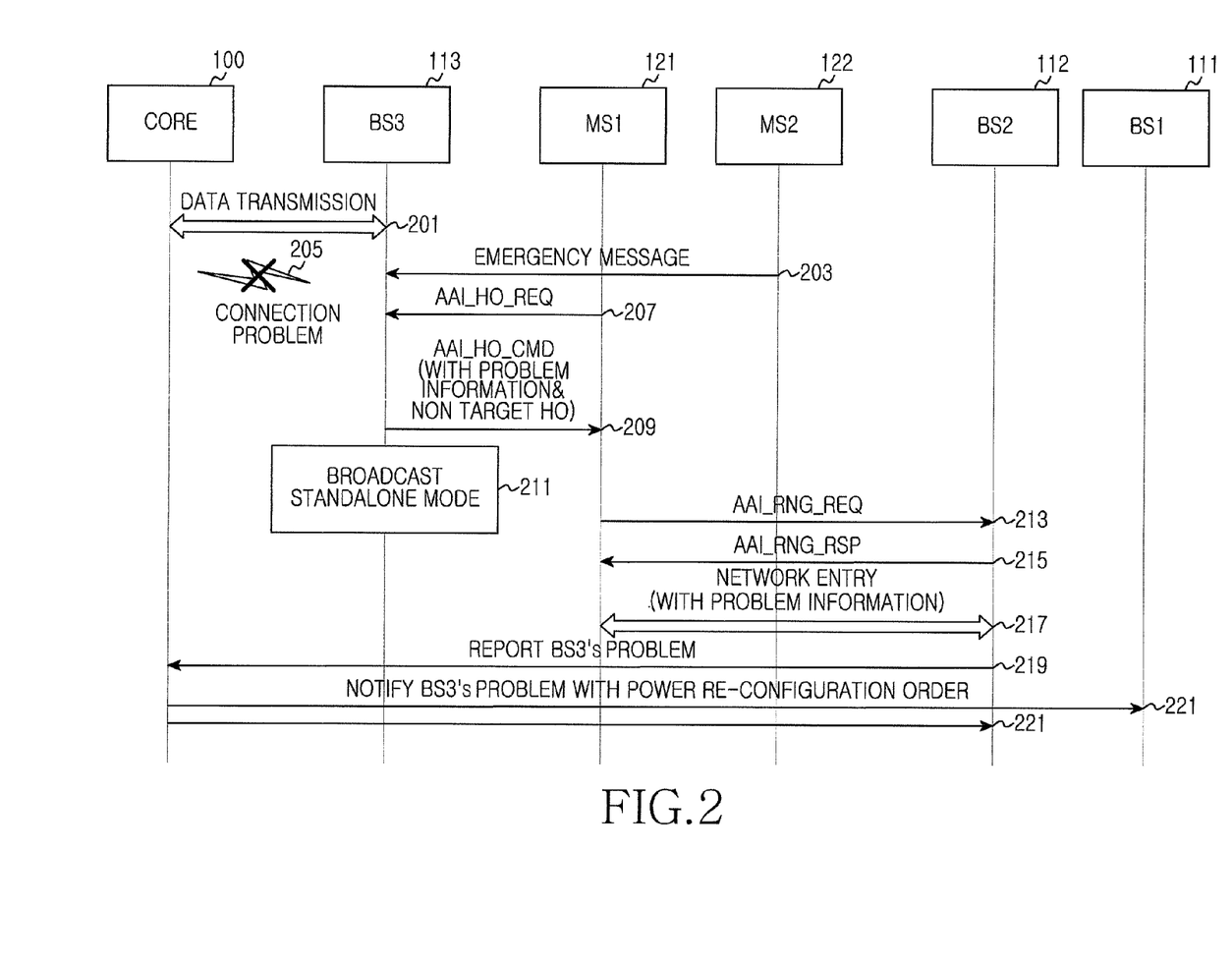
FIG. 2 illustrates signal flows of the base station for detecting and reporting the emergency to a core network in the wireless communication system according to an exemplary embodiment of the present disclosure.

FIG. 2 illustrates signal flows of the BS for detecting and reporting the emergency to the core network in the wireless communication system according to an exemplary embodiment of the present disclosure.

Referring to FIG. 2, the BS3 113 communicates with the core network 100 in step 201 and receives an emergency call message from the MSs in step 203. Herein, while the BS3 113 can receive the emergency call message from the plurality of the MSs, in this example, the emergency call message is received only from the MS2 122 for ease of understanding.

The BS3 113 receiving the emergency call message from the MSs determines the line disconnection from the core network 100 when the number of the received emergency call messages is greater than a threshold, and detects the emergency in step 205. Herein, although the BS3 113 successfully transmits and receives the keep-alive message to and from the core network 100 on the periodic basis, the BS3 113 can determine the connection problem with the core network 100 because of the emergency in the BS, determine the emergency, and perform the following operations.

After detecting the emergency, when the MS1 121 transmits a handover request (AAI_HO_REQ) message to the BS3 113 in step 207, the BS3 113 transmits to the MS1 121 the handover command (AAI_HO_CMD) message indicating the emergency occurred in the BS3 113 in step 209. That is, the BS having the emergency transmits the handover command message of Table 1 to the MS.

Table 1 shows the handover command message format according to an exemplary embodiment of the present disclosure.

TABLE 1

| Filed | Size | Value |
|---|---|---|
| Mode | 2 | 0b00: HO command |
| | | 0b01: Zone switch command from MZone to LZone; |
| | | 0b10: AMS HO request reject (ABS in list unavailable). In the case, AAI-HO-CMD message shall not include ant T-ABS. |
| | | 0b11: Reserved |
| If(Mode = 0b00){ Handover type | 1 | 0: Normal HO 1: Emergency HO |
| If(Handover type==1){ Serving BS Condition | 2 | 0b00: No reason |
| | | 0b01: BS Broken |
| | | 0b10: Backhaul Broken |
| | | 0b11: Reserved |
| Serving BSID } } | 48 | |
| (...) | (...) | (...) |

As shown in Table 1, "Handover type" indicates whether the corresponding handover is normal HandOver (HO) or emergency HO, and "Serving BS Condition" is information of various conditions in the cell coverage of the corresponding BS and can indicate the problem the emergency of the corresponding BS arises from. For example, "Serving BS Condition" can indicate that the emergency arises from the problem of the corresponding BS (BS Broken) or the problem between the corresponding BS and the core network (Backhaul Broken). "Serving BSID" is an identifier of the BS which transmits the handover command message, and is used for the MS receiving the handover command message, the handover target BS, and the core network to identify the BS having the emergency. Herein, the handover command message does not specify the handover target BS of the MS1 121 because the BS3 113 and the core network 100 are disconnected.

When there is no MS requesting the handover in step 207, the BS3 113 can search for an MS traveling in the cell boundary and transmit the handover command message to the searched MS. Herein, the MS in the cell boundary can be searched using various conventional methods. For example, the MS can be detected using location information reported by the MS.

Next, the BS3 113 transmitting the handover command message enters the standalone mode and services the MSs in its cell coverage in step 211. In so doing, the BS3 113 can notify the MSs in the cell of the standalone mode transition.

Meanwhile, the MS1 121 receiving the handover command message searches for neighboring BSs, determines the BS2 112 as the handover target BS, and transmits a ranging request (AAI_RNG_REQ) message to the BS2 112 in step 213. The ranging request message transmitted by the MS1 121 can indicate the emergency of the BS3 113.

Table 2 shows the ranging request message format according to an exemplary embodiment of the present disclosure.

TABLE 2

| Field | Size | Value |
|---|---|---|
| Ranging purpose indication type | 4 | 0b0000 = Initial network entry<br>0b0001 = HO reentry<br>0b0010 = Network reentry from idle mode<br>0b0011 = Idle mode location update<br>0b0100 = DCR mode extension<br>0b0101 = Emergency call setup (e.g., E911)<br>0b0110 = Location update for updating service flow management encodings of E-MBS flows<br>0b0111 = Location update for transition to DCR mode from idle mode<br>0b1000 = Reentry from DCR mode, coverage loss or detection of different ABS restart count. 0b1001 = Network reentry from a Legacy BS<br>0b1010 = Zone switch to MZONE from LZONE<br>0b1011 = Location update due to power down.<br>0b1100 = Experiencing "femto interference"<br>0b1101 = NS/EP call setup<br>0b1110 = Emergency HO<br>0b1111 = reserved |
| (...) | (...) | (...) |
| If(Ranging purpose indication == 0b1110){ | | //Emergency HO |
| MS MAC address | 48 | |
| Serving BSID | 48 | |
| Serving BS condition | 2 | 0b00: No reason<br>0b01: BS Broken<br>0b10: Backhaul Broken<br>0b11: Reserved |
| Initial Offset for uplink power control(Offset Initial) | 5 | The bit size represents power level ranging from−15 dB(0x00) to 16 dB(0x1F) with 1 dB step The value is determined by AMS after successful initial ranging process |
| } | | |
| (...) | (...) | (...) |

"Ranging purpose indication type" is information of the ranging purpose and additionally defines a value (0b1110=Emergency HO) indicating the emergency handover. Hence, the BS receiving the ranging request message can determine based on "Ranging purpose indication type=0b1110" that the ranging purpose of the corresponding MS is the emergency handover, and thus simplify the network entry procedure. "MS MAC address" indicates a Media Access Control (MAC) address of the corresponding MS, "Serving BSID" indicates the identifier of the BS having the emergency, and "Serving BS condition" indicates the status of the BS having the emergency; that is, indicates the problem causing the emergency. "Initial Offset for uplink power control (Offset Initial)" indicates an initial offset for uplink transmit power and is determined by the MS which performs an initial ranging procedure. "Initial Offset for uplink power control (Offset Initial)" can be used in the network entry procedure to simplify the network entry procedure.

Next, the BS2 112 receiving the ranging request message transmits a ranging response (AAI_RNG_RSP) message to the MS 121 in step 215, and the MS1 121 and the BS2 112 perform the network entry procedure in step 217. Herein, the network entry procedure can be carried out the same as the network entry procedure defined in the 802.16m. The MS1 121 handing over according to the emergency can simplify the network entry procedure by receiving its network context from the BS3 113 and forwarding it to the target BS2 112 in order to accelerate the network entry procedure. For the handover according to the emergency, when parameters negotiated between the MS and the BS are preset in the network entry procedure, the network entry can be simplified. For example, to accelerate the emergency handover, the parameters of the physical layer including MAC version, Privacy and Key Management (PKM) information, and Modulation and Coding Scheme (MCS) level can be preset.

In step 219, the BS2 transmits to the core network 100 a message reporting the emergency of the BS3 113. The message reporting the emergency can be constructed as shown in Table 3.

Table 3 shows the format of the message reporting the emergency of a particular BS to the core network.

TABLE 3

| IE | Reference point | Note |
|---|---|---|
| BSID | 5.3.2.25 | |
| >>Serving BS Condition | | TBD |

"BSID" indicates the identifier of the BS having the emergency, and "Serving BS Condition" indicates the condition of the BS having the emergency, which can be constructed as shown in Table 4.

TABLE 4

| Type | TBD |
|---|---|
| Length | 4 |
| Value | Indicate reason for emergency as follows:<br>0x00: No reason<br>0x01: BS Broken<br>0x10: Backhaul Broken<br>0x11: reserved |
| Description | Report of BS in Emergency |
| Parent TLV | None |

As shown in Table 4, "Serving BS Condition" can indicate the problem causing the emergency in the corresponding BS.

The core network 100 determines the emergency of the BS3 based on the message of Table 3, searches for neighboring BSs of the BS3, and transmits a power control message to the searched neighboring BSs in step 221. Herein, the neighboring BSs 111 and 112 receiving the power control message can control their power to cover the area omitted by the emergency of the BS3 113.

As stated above, when the emergency occurs in the BS in the wireless communication system, the emergency of the BS can be rapidly notified to the core network using the messages of Table 1, Table 2, and Table 3. Although it is not shown in Table 1, Table 2, and Table 3, time information may be added to the messages of Table 1, Table 2, and Table 3 in order to accurately determine the time of the emergency occurrence in the BS.

In the above, the target BS conducts all of the ranging procedure and the network entry procedure with the MS and then reports the emergency of the other BS to the core network. Yet, when the ranging request message indicating the emergency of the other BS is received, the target BS can report the emergency of the other BS to the core network and then the ranging procedure and perform the network entry procedure with the corresponding MS.

Figure 3:
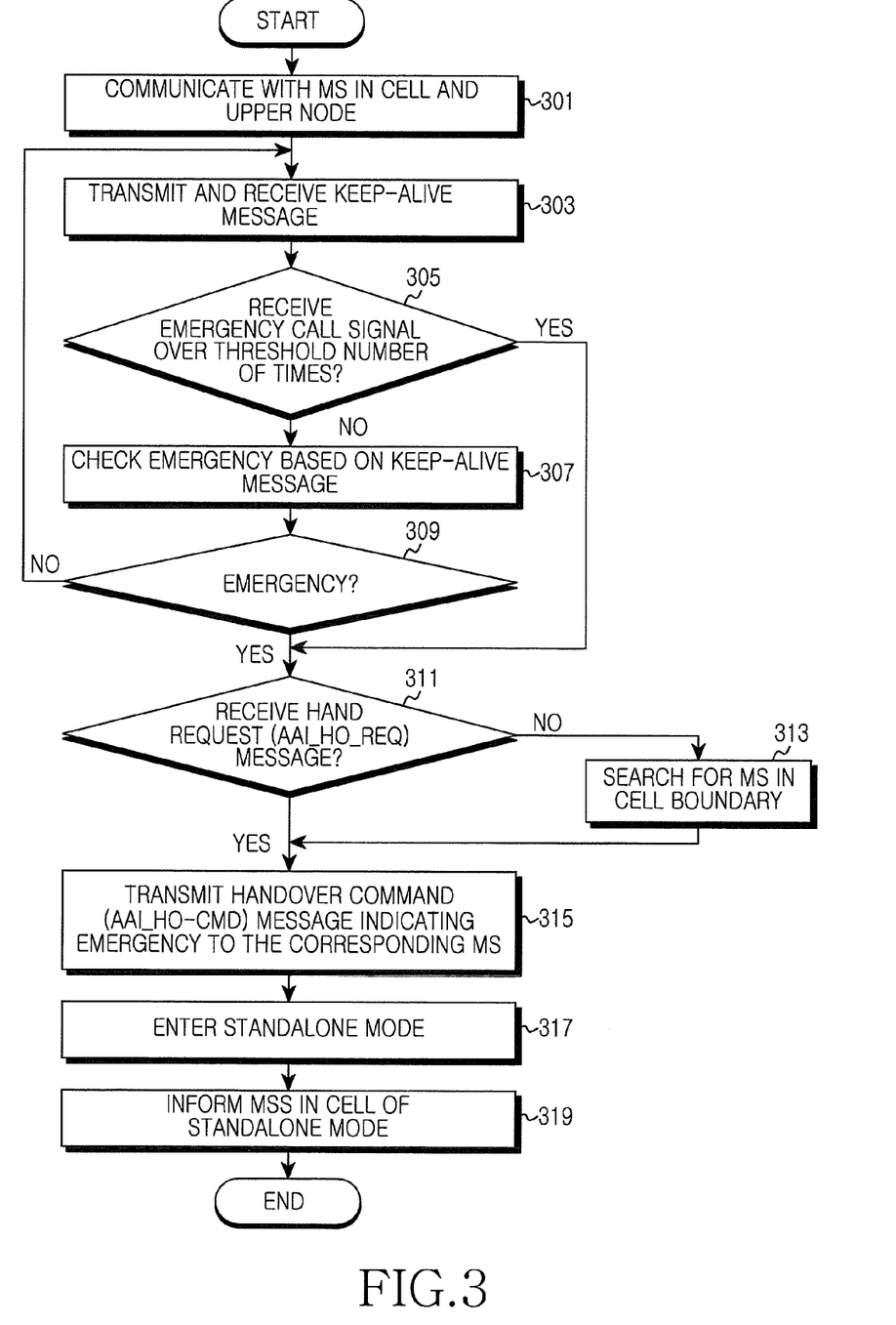
FIG. 3 illustrates operations of a serving base station for detecting the emergency in the wireless communication system according to an exemplary embodiment of the present disclosure.

FIG. 3 illustrates operations of the serving BS for detecting the emergency in the wireless communication system according to an exemplary embodiment of the present disclosure.

Referring to FIG. 3, the serving BS communicates with the MS in the cell and its upper node in step 301, and transmits and receives the keep-alive message to and from the core network in step 303. The keep-alive message is periodically transmitted and received to check whether the connection line between the serving BS and the core network is available.

In step 305, the serving BS determines whether the emergency call signal is received over the threshold number of times during a certain time. When receiving the emergency call signal over the threshold number of times during the certain time, the serving BS detects the emergency and goes to step 311.

By contrast, when not receiving the emergency call signal over the threshold number of times during the certain time, the serving BS determines whether or not the emergency occurs based on the keep-alive message in step 307. For example, the serving BS can determine whether the transmission and reception of the keep-alive message continuously fails over a preset number of times, and can determine the emergency when the transmission and reception of the keep-alive message continuously fails over the preset number of times.

Upon determining no emergency in step 309, the serving BS returns to step 303. When determining the emergency occurrence, the serving BS determines whether the handover request message is received from the MS in step 311.

When receiving the handover request message, the serving BS transmits the handover command message indicating the emergency to the MS requesting the handover in step 315. By contrast, not receiving the handover request message, the serving BS searches for the MS in the cell boundary in step 313 and transmits the handover command message indicating the emergency to the searched MS in step 315. Herein, the handover command message indicating the emergency can include the handover type indicating the emergency handover, the serving BS condition, and the serving BSID as shown in Table 1, and can further include the emergency detection time.

The serving BS transits to the standalone mode in step 317 and transmits the message indicating the standalone mode transition to the MSs in the cell in step 319. Herein, the serving BS entering the standalone mode can provide the MSs in the cell with all of the services not requiring the connection to the core network.

Next, the serving BS finishes this process.

Figure 4:
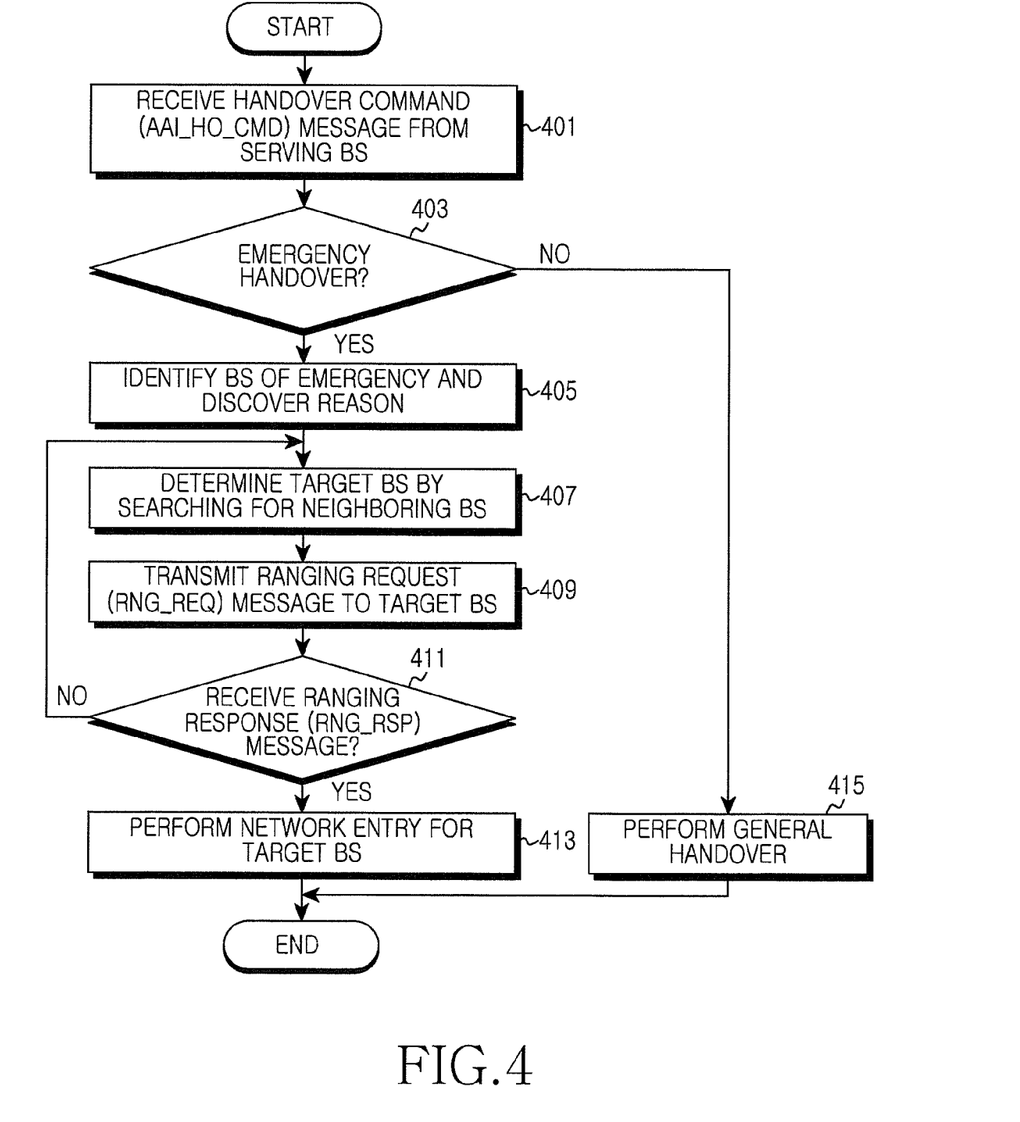
FIG. 4 illustrates operations for performing handover according to the emergency of the serving base station in the wireless communication system according to an exemplary embodiment of the present disclosure.

FIG. 4 illustrates operations for performing the handover according to the emergency of the serving BS in the wireless communication system according to an exemplary embodiment of the present disclosure.

Referring to FIG. 4, the MS receives the handover command message from the serving BS in step 401. The handover command message can include the handover type, the serving BS condition, and the serving BSID as shown in Table 1, and can further include the emergency detection time.

The MS receiving the handover command message determines whether the handover command message indicates the emergency handover in step 403. That is, the MS determines whether the handover type of the handover command message indicates the emergency handover. When it is not the emergency handover, the MS performs a conventional well-known handover procedure in step 415 and finishes this process.

By contrast, for the emergency handover, the MS identifies the BS having the emergency and discovers the reason of the emergency in step 405. That is, the MS checks the serving BSID indicating the BS of the emergency and checks the serving BS condition information indicating the reason of the emergency by analyzing the handover command message of Table 1.

In step 407, the MS determines the target BS by searching for the neighboring BS. Since the handover command message indicating the emergency does not specify the target BS, the MS conducts non-targeting handover. In so doing, the MS can determine the target BS by analyzing the signal strength of the neighboring BS.

In step 409, the MS transmits the ranging request message indicating the emergency of the serving BS, to the target BS. The ranging request message can include the ranging purpose, the MAC address of the MS, the serving BSID, the serving BS condition, and the initial offset information for the uplink power as shown in Table 2, and can further include the emergency detection time.

In step 411, the MS determines whether the ranging response message permitting the ranging is received. When not receiving the ranging response message permitting the ranging, the MS determines another target BS by searching for the neighboring BS back in step 407 and repeats the subsequent step.

By contrast, when receiving the ranging response message permitting the ranging, the MS performs the network entry procedure to the target BS in step 413. Herein, the same network entry procedure as the network entry procedure defined in the 802.16m can be carried out. In the emergency handover, the MS can simplify the network entry procedure by receiving its network context from the serving BS and forwarding it to the target BS. Also, in the emergency handover, the MS can simplify the network entry procedure by use of the preset parameters. For example, the physical layer parameters including the MAC version, the PKM information, and the MCS level can be preset to simplify the network entry procedure.

Next, the MS finishes this process.

Figure 5:
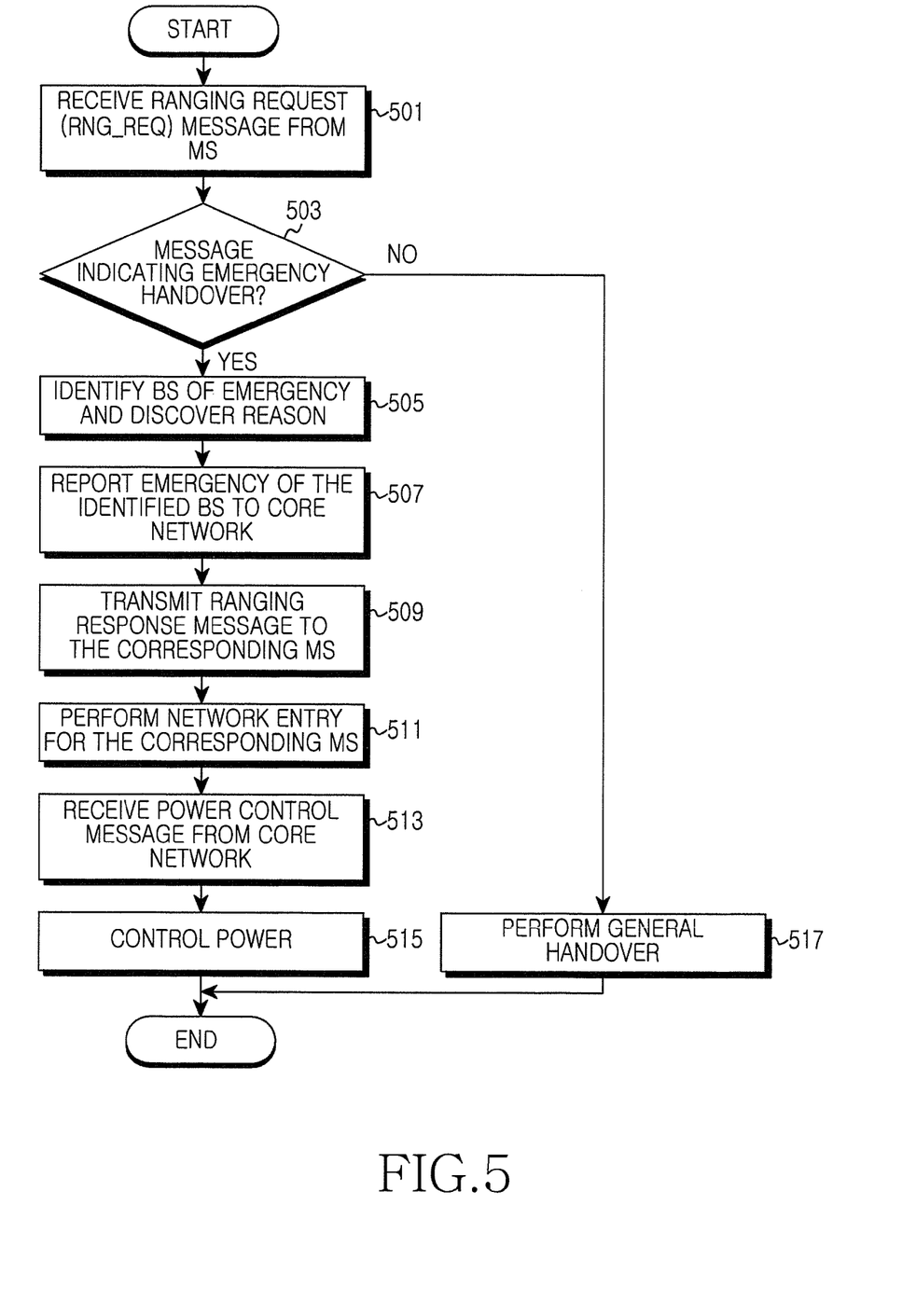
FIG. 5 illustrates operations of a target base station for reporting the emergency of the serving base station to a core network in the wireless communication system according to an exemplary embodiment of the present disclosure.

FIG. 5 illustrates operations of the target BS for reporting the emergency of the serving BS to the core network in the wireless communication system according to an exemplary embodiment of the present disclosure.

Referring to FIG. 5, the target BS receives the ranging request message from the MS in step 501 and determines whether the ranging request message aims for the emergency handover in step 503, which can be determined based on the ranging purpose of the ranging request message.

When the ranging request message does not aim for the emergency handover, the target BS performs the general handover as in the conventional method in step 517 and finishes this process.

By contrast, when the ranging request message aims for the emergency handover, the target BS identifies the BS having the emergency and discovers the reason of the emergency by analyzing the ranging request message in step 505. That is, the target BS confirms the serving BSID indicating the BS of the emergency and the serving BS condition information indicating the reason of the emergency by analyzing the ranging request message of Table 2.

In step 507, the target BS reports the emergency of the identified BS to the core network. In so doing, the target BS generates the message including the BSID in the emergency and the BS condition information in the emergency as shown in Table 3 and transmits the generated message to the core network.

The target BS transmits the ranging response message approving the ranging to the corresponding MS in step 509 and performs the network entry procedure for the corresponding MS in step 511.

Next, the target BS receives the power control message from the core network in step 513, covers the cell area of the serving BS having the emergency by controlling the power in step 515, and then finishes this process.

Figure 6:
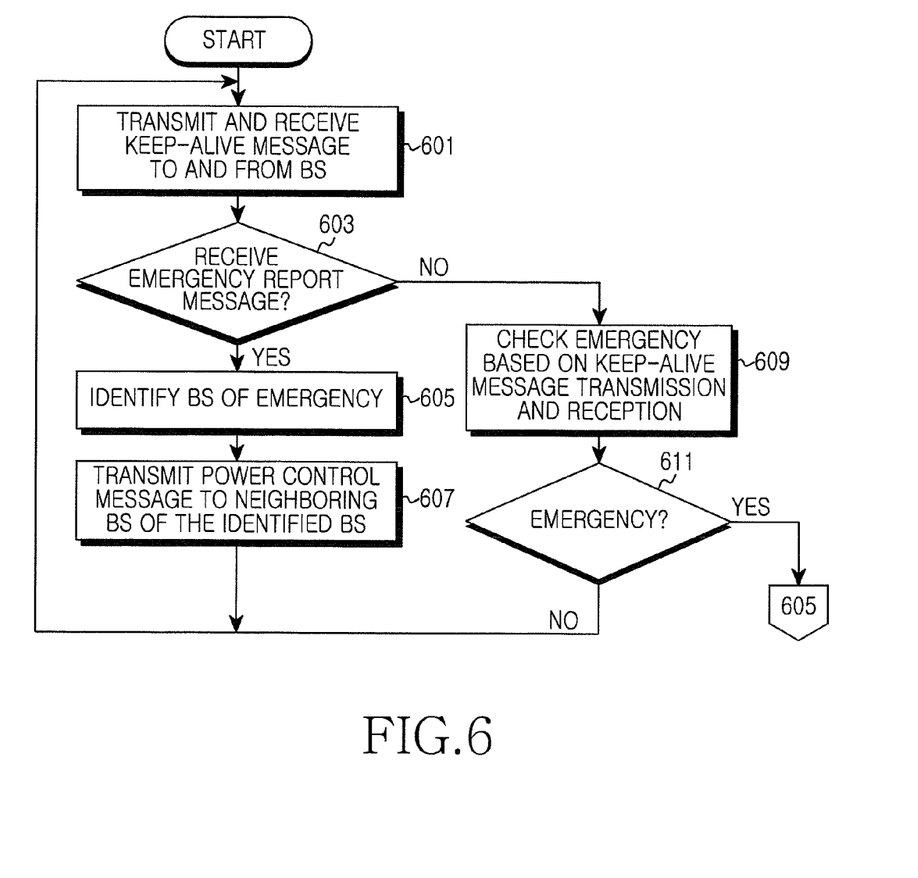
FIG. 6 illustrates operations of the core network for detecting the emergency of the base station in the wireless communication system according to an exemplary embodiment of the present disclosure.

FIG. 6 illustrates operations of the core network for detecting the emergency of the BS in the wireless communication system according to an exemplary embodiment of the present disclosure.

Referring to FIG. 6, the core network transmits and receives the keep-alive message to and from the BS in step 601. The keep-alive message is periodically transmitted and received to check the availability of the connection line between the BS and the core network.

In step 603, the core network determines whether the message reporting the emergency is received. Herein, the message reporting the emergency can include the ID of the BS having the emergency and the condition information of the BS having the emergency as shown in Table 3, and can further include the emergency detection time.

When receiving the message reporting the emergency, the core network goes to step 605. When not receiving the message reporting the emergency, the core network determines based on the keep-alive message whether the emergency occurs in step 609. For example, the core network determines whether the transmission and reception of the keep-alive message continuously fails over the threshold number of times. When the continuous failure exceeds the threshold number of times, the core network can determine the emergency. Upon determining the emergency in step 611, the core network proceeds to step 605. Not detecting the emergency, the core network returns to step 601.

The core network identifies the BS having the emergency in step 605, transmits the power control message to the BSs around the identified BS in step 607, and then goes back to step 601.

Figure 7:
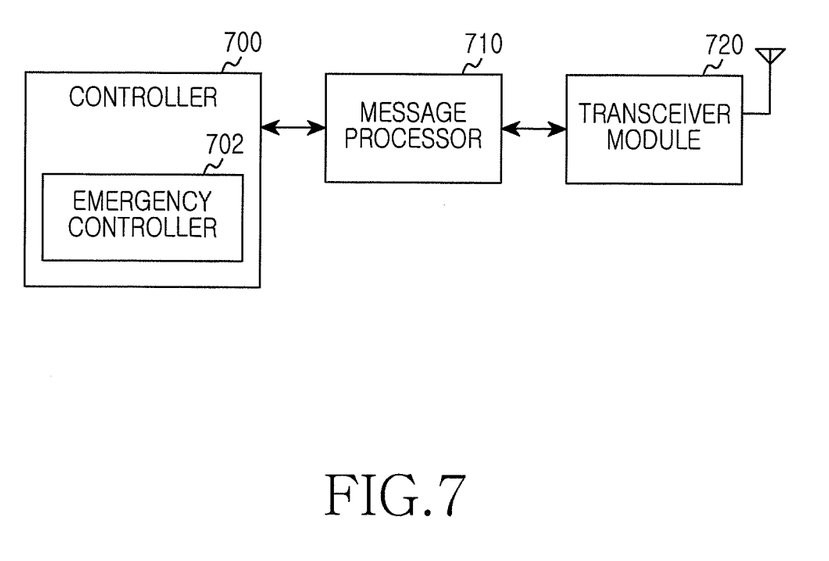
FIG. 7 illustrates the base station in the wireless communication system according, to an exemplary embodiment of the present disclosure.

FIG. 7 is a block diagram of the BS in the wireless communication system according to an exemplary embodiment of the present disclosure.

Referring to FIG. 7, the BS includes a controller 700, a message processor 710, and a transceiver module 720. The controller 700 includes an emergency controller 702.

The controller 700 controls and processes the operations for communicating with the MS in the cell and the upper node. Particularly, the controller 700 including the emergency controller 702 controls and processes to detect and handle the emergency.

In detail, the emergency controller 702 examines whether the connection line to the core network is available by periodically transmitting and receiving the keep-alive message to and from the core network, and determines whether the emergency call signal is received over the threshold number of times during the certain time. When the transmission and reception of the keep-alive message continuously fails over the preset number of times or the emergency call signal is received over the threshold number of times, the emergency controller 702 detects the emergency in the BS and controls and processes to report the emergency to the core network through the handover of the MS in the BS. More specifically, upon detecting the emergency, the emergency controller 702 controls and processes to transmit the handover command message indicating the emergency to the MS requesting the handover or the MS traveling in the cell boundary. The handover command message can be constructed as shown in Table 1. Next, the emergency controller 702 enters the standalone mode and controls and processes to notify the standalone mode to the MSs in the cell. Herein, the standalone mode is the mode which provides all of the services not requiring the connection to the core network.

When receiving the ranging requesting message for the emergency handover from the MS, the emergency controller 702 obtains the information of the BS having the emergency by analyzing the received ranging request message, and controls and processes to generate the emergency report message of Table 3 based on the obtained information and to transmit the generated message to the core network.

The message processor 710 generates and outputs a message to the transceiver module 720, analyzes the message output from the transceiver module 720, and outputs the analysis result to the controller 700 under the control of the controller 700. That is, the message processor 710 can generate the messages of Table 1 and Table 3 under the control of the controller 700.

The transceiver module 720 forwards the signal received by wire or by wireless to the message processor 710 in a preset manner, and processes and transmits the signal output from the message processor 710 to the corresponding device by wire or by wireless in a preset manner.

Figure 8:
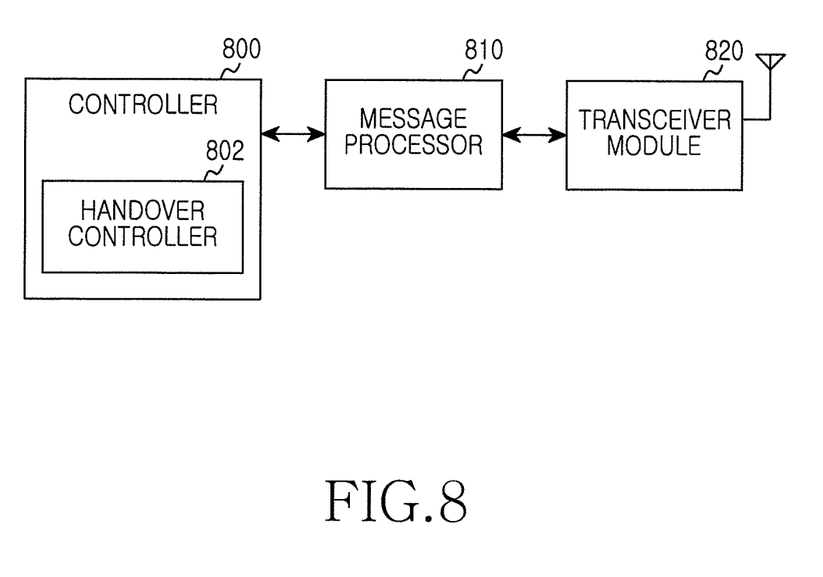
FIG. 8 illustrates a mobile station in the wireless communication system according to an exemplary embodiment of the present disclosure.

FIG. 8 is a block diagram of the MS in the wireless communication system according to an exemplary embodiment of the present disclosure.

Referring to FIG. 8, the MS includes a controller 800, a message processor 810, and a transceiver module 820. The controller 800 includes a handover controller 802.

The controller 800 controls and processes the operations of the MS. Particularly, the controller 800 including the handover controller 802 controls and processes to hand over from the serving BS to other BS. More specifically, upon receiving the handover command message indicating the emergency handover from the serving BS, the handover controller 802 determines the handover target BS by searching for the neighboring BSs, and controls and processes to transmit the ranging request message indicating the emergency of the serving BS to the target BS. The ranging request message indicating the emergency of the serving BS can be constituted as shown in Table 2.

When receiving the ranging response message permitting the ranging from the target BS, the handover controller 802 controls and processes the network entry. Herein, the same network entry procedure as the network entry procedure defined in the 802.16m can be carried out. The handover controller 802 can simplify the network entry procedure by receiving its network context of the MS from the serving BS and forwarding it to the target BS. Also, the handover controller 802 can simplify the network entry procedure by conducting the network entry procedure using the prearranged physical layer parameters including the MAC version, the PKM information, and the MCS level.

The message processor 810 generates and outputs a message to the transceiver module 820, analyzes the message output from the transceiver module 820, and outputs the analysis result to the controller 800 under the control of the controller 800. That is, the message processor 810 can generate the message of Table 2 under the control of the controller 800.

The transceiver module 820 processes the radio signal received from the BS and provides the processed signal to the message processor 810 in a preset manner, and processes the signal fed from the message processor 810 to a radio signal and transmits the radio signal to the corresponding BS in a preset manner.

Figure 9:
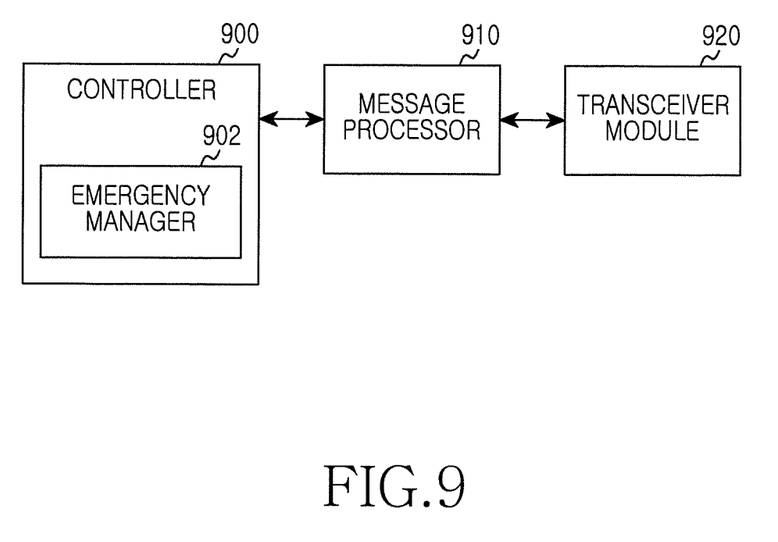
FIG. 9 illustrates the core network in the wireless communication system according to an exemplary embodiment of the present disclosure.

FIG. 9 is a block diagram of the core network in the wireless communication system according to an exemplary embodiment of the present disclosure.

Referring to FIG. 9, the core network includes a controller 900, a message processor 910, and a transceiver module 920. The controller 900 includes an emergency manager 902.

The controller 900 of the core network manages the BS and the MS for the communication service. Particularly, the controller 900 including the emergency manager 902 controls and processes to detect and handle the emergency of the BS. In more detail, the emergency manager 902 transmits and receives the keep-alive message to and from the BS. The keep-alive message is periodically transmitted and received to examine whether the connection line between the serving BS and the core network is available. The emergency manager 902, upon receiving the emergency report message of Table 3 from the BS, identifies the BS having the emergency by analyzing the received emergency report message and controls and processes to transmit the power control message to the neighboring BS of the identified BS.

The message processor 910 generates and outputs a message to the transceiver module 920, analyzes the message output from the transceiver module 920, and outputs the analysis result to the controller 900 under the control of the controller 900.

The transceiver module 920 processes the cable signal received from the BS and provides the processed signal to the message processor 910 in a preset manner, and processes the signal output from the message processor 910 to a cable signal and transmits the signal to the corresponding BS in a preset manner.

As set forth above, the BS detects the emergency based on the emergency call message received from the MS and reports the emergency to the core network through the handover of the MS in the cell coverage in the wireless communication system. Therefore, the emergency arising from the disconnection between the BS and the core network or other reasons can be detected within a short time and the emergency can be promptly handled without a separate system modification.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a serving Base Station (BS) for detecting an emergency in a wireless communication system, the method comprising:
    receiving emergency call signals from Mobile Stations (MSs) in a cell;
    determining whether a number of the received emergency call signals exceeds a threshold number of emergency call signals;
    if the number of the received emergency call signals exceeds the threshold number of emergency call signals, detecting the emergency of the serving BS;
    after detecting the emergency, entering a standalone mode; and
    transmitting a message indicating the emergency to a MS in the cell,
    wherein the standalone mode is a mode for providing services which do not require connection to a core network.

2. The method of claim 1, wherein the message indicating the emergency is a handover command message comprising at least one of a handover type, a serving BS condition, a serving BS identifier, and an emergency detection time, and further comprising:
    transmitting the handover command message to at least one of an MS requesting handover in the cell and an MS traveling in a cell boundary.

3. The method of claim 1 further comprising:
    informing the standalone mode transition to MSs in the cell.

4. A method of a Mobile Station (MS) for detecting an emergency occurrence in a wireless communication system, the method comprising:
    receiving a message including information indicating the emergency occurrence from a serving Base Station (BS); and
    transmitting a message including information indicating the emergency occurrence of the serving BS to a neighboring BS,
    wherein the serving BS enters a standalone mode after detecting the emergency occurrence, and wherein the standalone mode is a mode for providing services that do not use connection to a core network.

5. The method of claim 4, wherein the received message including information indicating the emergency occurrence is a handover command message.

6. The method of claim 4, wherein transmitting the message including information indicating the emergency occurrence of the serving BS to the neighboring BS comprises:
    determining a target BS among neighboring BSs; and
    transmitting a ranging request message including information indicating the emergency occurrence of the serving BS to the target BS,
    wherein the ranging request message comprises at least one of a ranging purpose, a Media Access Control (MAC) address of the MS, a serving BS identifier, a serving BS condition, an initial offset for uplink power, and an emergency detection time.

7. The method of claim 6 further comprising:
    receiving a request response message from the target BS; and
    performing a network entry procedure with the target BS.

8. A method of a neighboring Base Station (BS) for detecting an emergency of a serving BS in a wireless communication system, the method comprising:
    receiving a message including information indicating the emergency occurrence of the serving BS from a Mobile Station (MS), wherein the emergency occurrence indicates a number of received emergency call signals exceeds a threshold number of emergency call signals; and reporting the emergency occurrence of the serving BS of the MS to a core network.

9. The method of claim 8, wherein the message including information indicating the emergency occurrence of the serving BS is a ranging request message, and further comprising:
transmitting a ranging response message to the MS; and
performing a network entry procedure with the MS.

10. The method of claim 8, wherein the message reporting the emergency of the serving BS of the MS to the core network comprises at least one of a serving BS identifier, a serving BS condition, and an emergency detection time.

11. An apparatus of a serving Base Station (BS) configured to detect an emergency in a wireless communication system, the apparatus comprising:
a controller configured to determine whether a number of emergency call signals received from Mobile Stations (MSs) in a cell exceeds a threshold number of emergency call signals, detect the emergency of the serving BS if the number of the emergency call signals exceeds the threshold number of emergency call signals, after detecting the emergency, control the base station to enter a standalone mode, and control to transmit a message indicating the emergency to a MS in the cell; and
a transceiver configured to receive the emergency call signals from the MSs in the cell and transmit the message indicating the emergency to a MS in the cell under control of the controller,
wherein the standalone mode is a mode for providing services which do not require connection to a core network.

12. The apparatus of claim 11, wherein the message indicating the emergency is a handover command message comprising at least one of a handover type, a serving BS condition, a serving BS identifier, and an emergency detection time, and
the controller is further configured to control to transmit the handover command message indicating the emergency to at least one of an MS requesting handover in the cell and an MS traveling in a cell boundary.

13. The apparatus of claim 11, wherein the controller is further configured to control to inform the standalone mode transition to MSs in the cell.

14. An apparatus of a Mobile Station (MS) configured to detect an emergency in a wireless communication system, the apparatus comprising:
a controller configured to, if receiving a message including information indicating the emergency occurrence from a serving Base Station (BS), control to transmit a message including information indicating the emergency occurrence of the serving BS to a neighboring BS; and a transceiver configured to transmit and receive messages under control of the controller, wherein the serving BS enters a standalone mode after detecting the emergency occurrence, and wherein the standalone mode is a mode for providing services that do not use connection to a core network.

15. The apparatus of claim 14, wherein the received message including information indicating the emergency occurrence is a handover command message.

16. The apparatus of claim 15, wherein, if receiving the handover command message including information indicating the emergency occurrence from the serving BS, the controller is further configured to determine a target BS among neighboring BSs and control to transmit a ranging request message including information indicating the emergency occurrence of the serving BS to the target BS,
wherein the ranging request message comprises at least one of a ranging purpose, a Media Access Control (MAC) address of the MS, a serving BS identifier, a serving BS condition, an initial offset for uplink power, and an emergency detection time.

17. The apparatus of claim 16, wherein, if receiving a request response message from the target BS, the controller is further configured to control to perform a network entry procedure with the target BS.

18. An apparatus of a neighboring Base Station (BS) configured to detect an emergency of a serving BS in a wireless communication system, the apparatus comprising:
a controller configured to, if receiving a message including information indicating an emergency occurrence of the serving BS from a Mobile Station (MS), wherein the emergency occurrence indicates a number of received emergency call signals exceeds a threshold number of emergency call signals, control to report the emergency occurrence of the serving BS of the MS to a core network; and
a transceiver configured to transmit and receive messages under control of the controller.

19. The apparatus of claim 18, wherein the message including information indicating the emergency occurrence of the serving BS is a ranging request message, and
the controller is further configured to control to perform a network entry procedure with the MS by transmitting a ranging response message to the MS.

20. The apparatus of claim 18, wherein the message reporting the emergency of the serving BS of the MS to the core network comprises at least one of a serving BS identifier, serving BS condition, and an emergency detection time.

* * * * *